United States Patent [19]

Majima

[11] 4,268,880

[45] May 19, 1981

[54] MAGNETIC HEAD ASSEMBLY

[75] Inventor: Osamu Majima, Tokyo, Japan

[73] Assignee: Sony Corporation, Tokyo, Japan

[21] Appl. No.: 10,849

[22] Filed: Feb. 9, 1979

[30] Foreign Application Priority Data

Feb. 10, 1978 [JP] Japan ............................. 53-15773[U]

[51] Int. Cl.³ .................... G11B 21/10; G11B 21/04; G11B 5/54

[52] U.S. Cl. .................................... 360/109; 360/77; 360/107

[58] Field of Search .............................. 360/107–109, 360/70, 77; 179/100.4 P, 100.41 P; 339/98, 97 R

[56] References Cited

U.S. PATENT DOCUMENTS

| | | | |
|---|---|---|---|
| 2,478,223 | 8/1949 | Argabrite | 179/100.4 P |
| 3,247,404 | 4/1966 | Batsch | 179/100.41 P |
| 3,586,356 | 6/1971 | Smalarz | 360/109 X |
| 3,880,489 | 4/1975 | Dauser, Jr. | 339/98 |
| 4,070,082 | 1/1978 | Werner | 339/98 |
| 4,151,569 | 4/1979 | Hathaway | 360/107 X |
| 4,172,265 | 10/1979 | Sakamoto et al. | 360/109 X |

*Primary Examiner*—John H. Wolff
*Attorney, Agent, or Firm*—Lewis H. Eslinger; Alvin Sinderbrand

[57] ABSTRACT

A magnetic head assembly comprising a deflectable piezo-electric member, such as a bi-morph leaf assembly, adapted for deflection in response to a voltage applied thereto, a magnetic head mounted on one end of the piezo-electric member and a U-shaped holder for the piezo-electric member. The U-shaped holder is formed of resilient material and has a pair of legs whose free ends are spring biased toward each other. The end of the piezo-electric member which is remote from the magnetic head is positioned between and clamped by the spring biased free ends of the legs of the holder. In one embodiment, a voltage is supplied to the piezo-electric member by a pair of plates, each formed of insulating material, with the clamped end of the piezo-electric member sandwiched between these plates, and with conducting member provided on at least one of the plates and in electrical contact with the piezo-electric member.

15 Claims, 4 Drawing Figures

U.S. Patent May 19, 1981 Sheet 1 of 2 4,268,880
FIG. 1
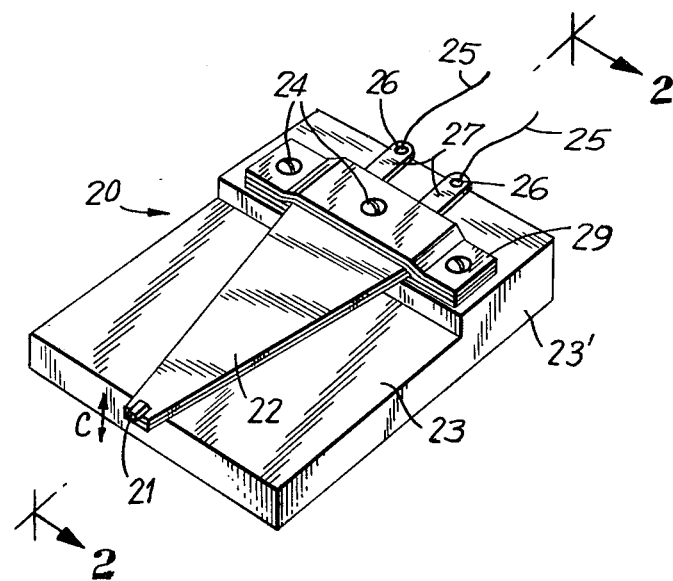
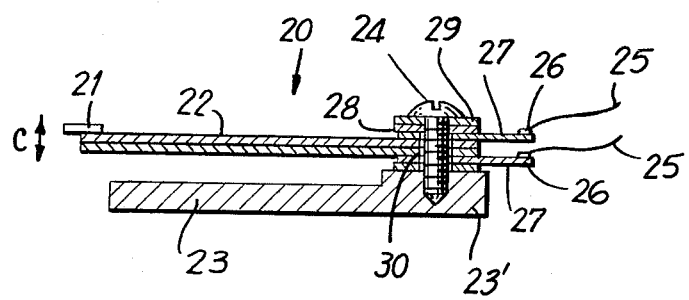
FIG. 2

MAGNETIC HEAD ASSEMBLY

BACKGROUND OF THE INVENTION

This invention relates to a magnetic head assembly and, more particularly, to such an assembly which includes a deflectable piezo-electric support member for the magnetic head and which, when energized, is adapted to displace the head.

In various types of signal recording and/or reproducing apparatus, it is advantageous to adjust the magnetic head in its relation to the magnetic medium upon which signals are recorded. For example, in an audio magnetic tape recorder, audio signals generally are recorded in one or more longitudinal tracks on the magnetic tape. Because of various factors, the relationship of the head with respect to a record track during a playback operation may differ from the relationship of the head with respect to the record track during the recording operation. In this instance, the head should be adjustable such that it can be positioned during the playback operation in the same juxtaposition with respect to the record track as was experienced during the recording operation. Also, in video signal recording/reproducing apparatus, such as a video tape recorder (VTR), video signals are recorded in parallel, skewed tracks by rotating magnetic heads, and the position of these heads often must be adjusted during the playback operation so as to coincide with the recorded tracks.

It has been proposed to provide an adjustable support for a magnetic head for use in the aforementioned audio or video apparatus. This adjustable support, known to those of ordinary skill in the art as a bi-morph leaf assembly, is responsive to an electrical voltage so as to deflect, thereby displacing the magnetic head supported thereon. The amount and direction of this deflection, and thus the amount and direction of displacement of the magnetic head, is a function of the amplitude and polarity of the energizing voltage supplied to the bi-morph leaf assembly. Thus, and for the environment of a VTR, in the event that, during a playback operation, the scanning traces of the magnetic heads do not coincide with the record tracks, the bi-morph leaf assemblies can be suitably energized so as to displace the heads, whereby their scanning traces now conform to the previously recorded record tracks. An example of one type of bi-morph leaf assembly is disclosed in co-pending application Ser. No. 825,861, now U.S. Pat. No. 4,167,763 assigned to the assignee of the present invention. As described therein, the bi-morph leaf assembly is constructed of two leaves of piezo-electric ceramic material, each leaf having its opposite surfaces plated with electrodes, the leaves being in electrical and mechanical contact with each other. Depending upon the voltage applied across the leaves, the piezo-electric ceramic members deflect accordingly. Other examples of bi-morph leaf assemblies are described in U.S. Pat. No. 4,080,636 and U.S. Pat. No. 3,787,616.

One difficulty in assembling and using bi-morph leaf assemblies is in the connection of the electrical conducting lead or leads to the electrically conductive surfaces thereof. Typically, a lead is soldered to the bi-morph leaf assembly. However, this results in heating the assembly, whereby the electrical and/or physical characteristics thereof are deleteriously affected. Furthermore, the soldering process is quite time-consuming and, thus, expensive, and must be performed by a skilled technician. Also, there is difficulty in obtaining uniformity in these assembled bi-morph leaf assemblies. Hence, proper quality control often is not achieved.

Another problem encountered with bi-morph leaf assemblies is that of mechanically coupling the assembly to a suitable support structure. For example, in the environment of a VTR, the assembly must be mounted on a rotary device, such as a rotary drum. This can be accomplished by securing the bi-morph leaf assembly to a mounting plate by the use of mounting screws which pass through the assembly into the plate. When so mounted, electrical leads can be soldered to lugs which are secured to the electrically conductive surfaces of the bi-morph assembly. However, for this mounting arrangement, a hole must be provided in the bi-morph assembly for the mounting screw. It may be difficult to provide such a hole and, moreover, may degrade the characteristics of the ceramic material from which the bi-morph assembly is constructed. For example, the strength of the material may be seriously weakened. Also, if this mounting arrangement is to be used in, for example, a rotary head record/playback device, vibrations in the assembly, which may be expected during normal recording or playback operations, may loosen the mounting screw, thereby affecting the stability of the mounting assembly. Still further, the securing of the bi-morph leaf assembly to the mounting plate also is time-consuming.

OBJECTS OF THE INVENTION

Therefore, it is an object of the present invention to provide an improved magnetic head assembly including a piezo-electric ceramic member, which avoids the aforenoted problems attending the prior art.

Another object of this invention is to provide a magnetic head assembly of the aforenoted type in which the piezo-electric ceramic member, or bi-morph leaf, is securely mounted in a suitable holder therefor.

A further object of this invention is to provide a magnetic head assembly of the aforenoted type in which the bi-morph leaf is mounted rapidly and easily to its holder, and wherein electrical connections are made to the bi-morph leaf in the absence of the above-mentioned problems.

An additional object of this invention is to provide a magnetic head assembly of the aforenoted type wherein electrical connections are made to the bi-morph leaf without the need for soldering.

Yet another object of this invention is to provide an improved magnetic head assembly of the aforenoted type in which the bi-morph leaf is mounted on a suitable holder without the necessity of providing a hole in the ceramic material of the bi-morph leaf.

Another object of this invention is to provide an improved magnetic head assembly of the aforenoted type which can be manufactured at a lower cost and in higher quantities of production.

A further object of this invention is to provide an improved magnetic head assembly of the aforenoted type in which repairs thereto can be made rapidly and easily merely by removing one bi-morph leaf, together with its attached magnetic head, from its holder, and by replacing same with another.

A still further object of this invention is to provide an improved magnetic head assembly which exhibits relatively high uniformity from one unit to another, is relatively free from loosening during use thereof, and exhibits high strength.

Various other objects, advantage and features of the present invention will become readily apparent from the ensuing detailed description, and the novel features will be particularly pointed out in the appended claims.

SUMMARY OF THE INVENTION

In accordance with this invention, a magnetic head assembly is comprised of a deflectable piezo-electric member, such as a bi-morph leaf assembly, adapted for deflection in response to a voltage applied thereto, a magnetic head mounted on one end of the piezo-electric member, and a holder for the piezo-electric number. The holder is U-shaped and is formed of resilient material. The legs of the U-shaped holder are spring biased toward each other and receive the piezo-electric member therebetween. Thus, the spring-biased free ends of the legs of the holder clamp the other end of the piezo-electric member (i.e., the end which is remote from the head-mounted end). Means are provided for applying a voltage to the piezo-electric member. In the preferred embodiment, the end of the piezo-electric member which is clamped between the free ends of the holder is sandwiched between a pair of plates formed of insulating material. A conducting member is provided on one or both of these plates, the conducting member being in electrical contact with the top and/or bottom electrically conducting surface of the piezo-electric member so as to supply a voltage thereto when a voltage is applied to the conducting member.

BRIEF DESCRIPTION OF THE DRAWINGS

The following detailed description, given by way of example, will best be understood in conjunction with the accompanying drawings in which:

FIG. 1 is a perspective view of one type of magnetic head assembly which suffers from disadvantages that are avoided by the present invention;

FIG. 2 is a sectional side view of the apparatus illustrated in FIG. 1;

DETAILED DESCRIPTION OF A PREFERRED EMBODIMENT

Figure 3:
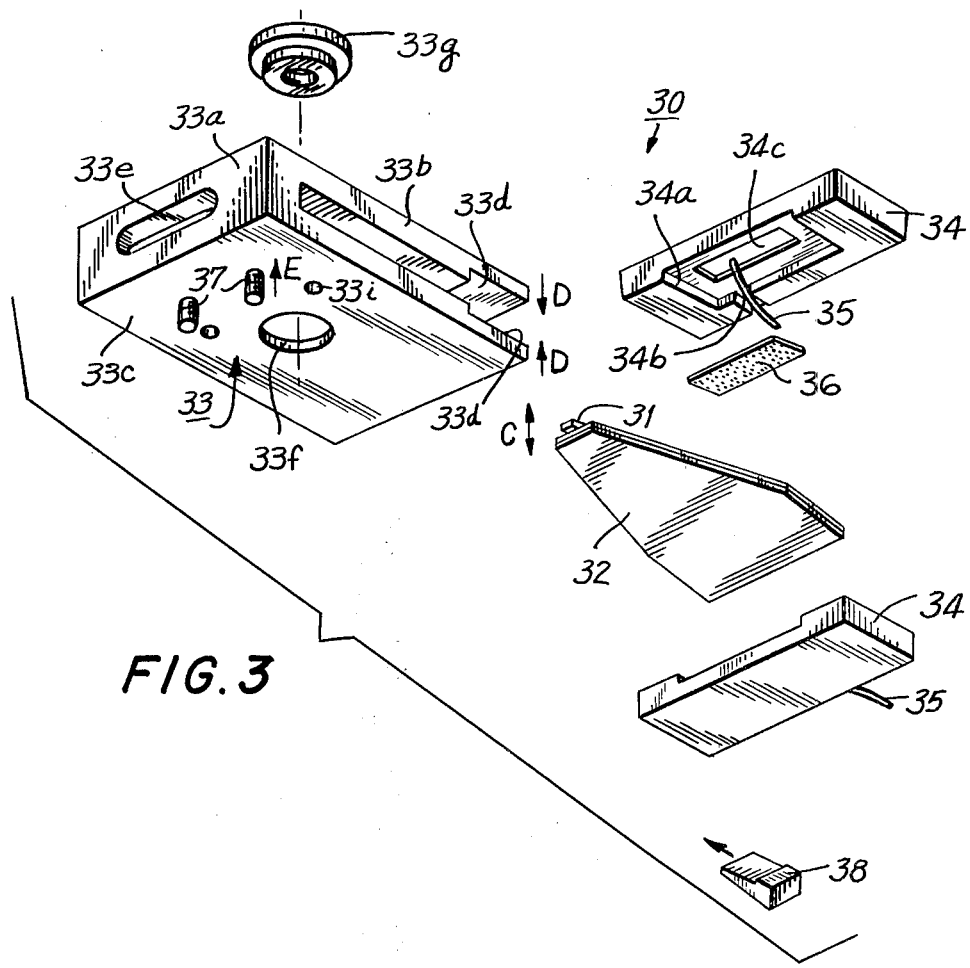
FIG. 3 is an exploded perspective view of one embodiment of the present invention.

Before describing the present invention, reference is made to FIGS. 1 and 2 which illustrate a magnetic head assembly which suffers from certain disadvantages that are avoided by the present invention. Assembly 20 is comprised of a magnetic head 21, a deflectable support therefor 22 and a mounting plate 23. Magnetic head 21 may, for example, comprise a ferrite head formed of a ferrite core wound with a coil and having a gap in the core. Typically, the dimensions of such a magnetic head are 2 mm. wide and 2 mm. high with a head gap of 1 micron. Generally, the gap is aligned in a direction which is normal to the track scanned by the head. In many applications, the gap may have an azimuth angle, that is, the gap is disposed at a particular angle relative to the record track or to the direction of the scanning trace of the head with respect to the magnetic medium.

As illustrated, head 21 is mounted on one end of deflectable support 22 and extends beyond a remote edge of the support. Support 22 is, typically, a bi-morph leaf assembly formed of two piezo-electric ceramic leaves, each leaf having top and bottom surfaces formed of electrically conductive material. The bottom surface of one leaf is in mechanical and electrical contact with the upper surface of the other leaf. If a voltage is applied across this bi-morph leaf assembly, that is, if a voltage is applied across the upper electrically conductive surface of the upper piezo-electric ceramic leaf and the lower electrically conductive surface of the lower piezo-electric ceramic leaf, the bi-morph assembly will bend, or deflect, in a direction dependent upon the polarity of this voltage and by an amount which is a function of the voltage magnitude. This deflection results in displacing head 21 in the direction indicated by arrow C. That is, bi-morph leaf assembly 22, when energized by a suitable voltage thereacross, displaces head 21 in the illustrated up-and-down direction. In many recording and reproducing applications, it has been found useful to deflect head 21 in this manner so as to account for or correct tracking errors, as is known to those of ordinary skill in the art.

In FIG. 1, the overall configuration of bi-morph leaf assembly 22 is triangular. If head 21 is assumed to be mounted in the vicinity of the apex of this triangular shape, then the base of this shape is shown as being secured to mounting plate 23. In particular, mounting plate 23 is provided with a raised base 23' upon which bi-morph leaf assembly 22 is secured. A tie-down strap 29, which may be formed of a suitable metal, is secured at opposite ends thereof to base 23' be screws 24. In addition, another screw 24 extends through the middle portion of tie-down strap 29 and through a suitable hole provided in the base of bi-morph leaf assembly 22 into base 23' of mounting plate 23. It is appreciated that, by fixing the base of bi-morph leaf assembly 22 to the raised base 23' of mounting plate 23, the bi-morph leaf assembly is enabled to deflect with respect to its base so as to correspondingly displace head 21, as desired.

Electrical connecting lugs 26 are secured to the upper and lower surfaces of bi-morph leaf assembly 22 so as to permit these surfaces to be supplied with a suitable energizing voltage. These lugs may, for example, be soldered to the bi-morph leaf assembly, or may be adhesively secured thereto by an electrically conductive adhesive. It is possible that these lugs may be placed in mechanical and electrical contact with bi-morph leaf assembly 22 merely by the pressure exerted thereon when tie-down strap 29 is secured to mounting plate 23. That is, when the illustrated assembly is assembled, lugs 26 merely may be sandwiched between tie-down strap 29, bi-morph leaf assembly 22 and raised mounting base 23'. Preferably, insulating members, such as insulating plates 28, are provided to insulate the upper lug (as viewed in FIG. 2) from tie-down strap 29, and to insulate the lower lug from raised base 23'.

Electrical conducting leads 25 are soldered to the free ends of lugs 26 so as to supply a voltage thereto and, thus, across bi-morph leaf assembly 22.

It is appreciated that, in order to secure bi-morph leaf assembly 22 firmly to mounting plate 23, it is necessary that a hole 30 be formed in the base end of the bi-morph leaf assembly so that screw 24 can extend therethrough, and thus secure the bi-morph assembly to the mounting plate. This requires careful machining of the piezo-electric ceramic leaves which constitute the bi-morph leaf assembly. Not only is such machining time-consuming and, thus, relatively expensive, but it also is a source of weakening in the strength of the ceramic material. Because of this hole, the electrical and physical properties of bi-morph leaf assembly 22 may be deleteriously affected. Furthermore, since hole 30 provided in one bi-morph leaf assembly may not be precisely identical to a similar hole provided in another bi-morph assembly, there also is the possibility that the characteristics of one bi-morph assembly may differ from those of the other. Hence, there is a problem in uniformity from one head assembly to another.

Yet another disadvantage is that, during a normal operation wherein bi-morph leaf assembly 22 is deflected repeatedly, and wherein the illustrated head assemby is provided in, for example, a rotary head recording/playback device, vibrations in the illustrated assembly may loosen one or more of screws 24. This also can degrade the amount of deflection of bi-morph leaf assembly 22. Still further, if lugs 26 merely are maintained in electrical contact with bi-morph assembly 22 by pressure and are not soldered or adhesively affixed thereto, the loosening of screws 23 will impair this electrical contact. Still further, the illustrated head assembly is not readily adaptable for repairs or replacement of head 21 or of bi-morph assembly 22. This is because a significant amount of time is needed to remove tie-down strap 29, remove bi-morph assembly 22 and then assemble a new bi-morph assembly to mounting plate 23.

Figure 4:
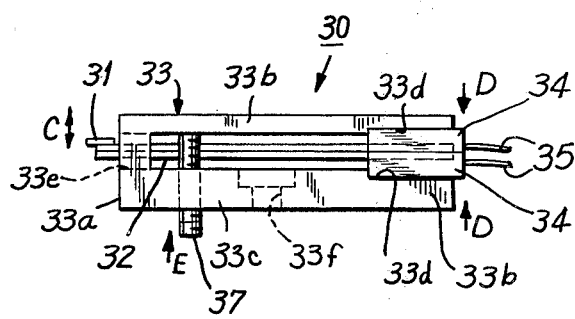
FIG. 4 is a side view of the embodiment shown in FIG. 3.

The difficulties encountered in head assembly 20 are avoided by the improved head assembly 30 in accordance with the present invention, as illustrated in FIGS. 3 and 4. Head assembly 30 is comprised of a magnetic head 31, a bi-morph leaf assembly 32, a holder 33 and means 34 for applying a voltage to the bi-morph leaf assembly. Head 31 may be silimar to aforedescribed head 21. Bi-morph leaf assembly 32 may be comprised of a pair of piezo-electric current ceramic leaves, each of which having top and bottom electrically conductive surfaces, as by coating or vapor-depositing suitable conductive material thereto. As described previously, the bottom surface of the upper piezo-electric ceramic leaf and the top surface of the lower piezo-electric ceramic leaf are placed in intimate electrical contact with each other. This piezo-electric ceramic material, also known simply as a piezo ceramic material, may be formed of a solid solution of $PbZrO_3$ and $PbTiO_3$, known as PZT. The polarizing direction of the upper and lower piezo ceramic leaves are opposite to each other, for example, such polarization directions may be toward each other. Thus, the bi-morph assembly will deflect in a direction depending upon the polarity of the voltage applied thereacross, that is, the voltage applied across the top surface of the upper piezo ceramic leaf and the bottom surface of the lower piezo ceramic leaf, and the amount of this deflection is dependent upon the magnitude of the applied voltage.

Head 31 is secured to one end of bi-morph leaf assembly 32 by, for example, a suitable adhesive, such that the recording/playback face of the head, and specifically, the gap thereof, projects beyond the extremity of the bi-morph assembly. Suitable conducting leads (not shown) are connected to head 31 for supplying signals thereto for recording or for transmitting to further circuitry those signals which are reproduced by the head.

Holder 33 is substantially U-shaped having a base 33a to which are joined a pair of legs 33b and 33c. In the illustrated arrangement, leg 33b is shown as the upper leg and leg 33c is shown as the lower leg. Holder 33 is constructed of resilient material, such as phosphor bronze, copper, stainless steel, or other suitable metals or, if desired, plastics. Consequently, legs 33b and 33c are spring biased toward each other, as represented by the arrows D in FIGS. 3 and 4. The legs of the holder are of substantially rectangular configuration, and appear as plates.

Juncture 33a, that is, the base of U-shaped holder 33, is provided with a window 33e through which magnetic head 31 and an end portion of bi-morph assembly 32 protrude when the illustrated elements are assembled. The free ends 33d of each of legs 33b and 33c are contoured, or cut out, so as to provide recesses for receiving a pair of plates 34, to be described. One or more holes are provided in leg 33c, these holes being threaded to receive screw members 37. As shown more clearly in FIG. 4, the upper end of each of screw members 37 abuts against leg 33b. If the screw members are rotated so as to be driven in the direction indicated by arrow E, the inherent spring biasing of the legs toward each other is overcome, and the legs are forced apart. Hence, the spring-bias force exerted on legs 33b and 33c can be adjusted by screw members 37.

Leg 33c is provided with a hole 33f by which holder 33 can be secured to other apparatus (not shown), such as a rotary head drum in a VTR, or other head mounting means. Hole 33f may be threaded so as to receive a mounting bolt. As shown in FIG. 4, hole 33f may be stepped so as to accommodate a nut 33g for engaging the aforementioned mounting bolt. Additional holes 33i may be provided in leg 33c to receive additional mounting screws, as may be needed or desired in securing magnetic head assembly 30 to a suitable support structure.

The means for applying a voltage to bi-morph assembly 32 is illustrated herein as comprising a pair of plates 34, each plate being formed of insulating material, such as a synthetic resin. For example, each plate 34 may be made of polycarbonate, a polyamide, or the like. Both plates may be symmetrically formed and, as shown in FIG. 3, each plate may include a recess 34a which is sized to accommodate the end portion of bi-morph assembly 32, which end portion is remote from the end upon which head 31 is mounted. A channel 34b is formed in plate 34 for receiving an electrical conducting lead 35. An indentation 34c in plate 34 also may be provided to receive the end of lead 35 and to secure that end thereto. A conductive member 36, such as a strip of conductive material, for example, a strip of conductive rubber material, is received in indentation 34c and is placed in good electrical contact with the end of lead 35.

In assembling the illustrated apparatus, conductive strip 36 is inserted into indentation 34c in plate 34 so as to make good electrical contact with lead 35. Then the end of bi-morph assembly 32 which is remote from head 31 is inserted into recess 34a of upper plate 34. Lower plate 34 then is brought against the bottom surface of the bi-morph assembly such that the bi-morph assembly is received in recess 34a of the lower plate. That is, bi-morph assembly 32 is sandwiched between upper and lower plates 34, and the top and bottom surfaces of the bi-morph assembly are in electrical contact with conductive strips 36 which are inserted into indentations 34c of the upper and lower plates.

Legs 33b and 33c of holder 33 are forced apart by driving screws 37 in the direction E. Hence, cut-outs 33d of these legs are adapted to receive plates 34 which contain bi-morph assembly 32 therebetween. The bi-morph assembly then is inserted between legs 33b and 33c so as to pass between screws 37, whereby head 31 and a corresponding end portion of the bi-morph assembly pass through and protrude beyond window 33e, as shown in FIG. 4. Screws 37 then are rotated in the opposite direction (e.g. counterclockwise) so that legs 33b and 33c once again are spring biased toward each other. The free ends of these legs thus clamp plates 34, and bi-morph assmebly 32 sandwiched therebetween, in the fixed position illustrated in FIG. 4. Recesses 34a in plates 34 inhibit bi-morph assembly 32 from rotating therein, and, similarly, recesses 33d in legs 33b and 33c prevent plates 34 from rotating. Also, the shoulders formed by recesses 33d define stops for plates 34.

Once bi-morph assembly 32 and plates 34 are assembled in holder 33, the holder then can be mounted upon a suitable support structure, such as a rotary head drum used in a helical scan VTR. Energizing voltages applied to leads 35 are supplied vai conductive strips 36 to the top and bottom surfaces of bi-morph assembly 32. This establishes an electric field in the piezo ceramic material for deflecting the bi-morph assembly in a direction determined by the polarity of this voltage and by an amount which is a function of the voltage magnitude. Hence, head 31 is displaced in the direction indicated by arrow C.

It is seen that, in the magnetic head assembly illustrated in FIGS. 3 and 4, conducting leads, such as leads 35, need not be soldered to the piezo ceramic material constituting bi-morph leaf assembly 32. This avoids deleteriously affecting the electrical and physical properties of the bi-morph assembly. The use of conductive strips 36, and preferably conductive rubber material, provides good electrical contact between leads 35 and the top and bottom surfaces of bi-morph assembly 32.

Furthermore, the clamping function carried out by legs 33b and 33c of U-shaped holder 33 provides a secure mounting for the bi-morph assembly. There is no need to form a hole or holes in the piezo ceramic material in order to obtain a secure mount.

The illustrated magnetic head assembly is relatively simple in its construction and assembly. Hence, manufacturing costs can be maintained desirably low. Furthermore, if repairs or replacement are needed, the bi-morph assembly can be removed quickly from holder 33 merely by driving screws 37 in the direction of arrow E so as to unclamp the bi-morph assembly. A new bi-morph assembly 32 or new plates 34 then can be substituted; and the replaced apparatus can be rapidly reassembled.

Still further, it is appreciated that holder 33 effectively surrounds bi-morph assembly 32. The holder thus acts as a protective shield for the bi-morph assembly which, as is known, is relatively brittle.

If conductive rubber material is used as conductive strips 36, as is preferred, good electrical contact is made between leads 35 and bi-morph assembly 32. Since it is necessary only to apply a suitable voltage across the bi-morph assembly, and since current need not be supplied thereto, the conductive rubber material functions as an excellent voltage supply path.

While the present invention has been particularly shown and described with reference to a preferred embodiment, it should be readily apparent to those of ordinary skill in the art that various changes and modifications in form and details may be made without departing from the spirit and scope of the invention. For example, bi-morph assembly 32 may be replaced by a so-called mono-morph leaf assembly. Also, it may be necessary only to apply a voltage to just one surface of the piezo ceramic material. In that event, only a single lead 35 is needed. Lower plate 34 thus need not include a channel 34b or an indentation 34c, nor need another conductive strip 36 be provided. Still further, recess 34a also need not be provided, in this instance, in bottom plate 34. In fact, the entire bottom plate can be omitted; and leg 33c can be provided with a raised step in place of cut-out 33d for supporting the piezo ceramic leaf.

As another alternative, means other than screw members 37 may be used to overcome the spring biasing of legs 33b and 33c. For example, a wedge member 38 may be inserted between legs 33b and 33c so as to force these legs apart for the purpose of removing and/or inserting bi-morph assembly 32 and plates 34. Still further, a screwdriver or other tool can be utilized in place of wedge 38 for this purpose.

In addition to the foregoing, various other changes and modifications in form and details may be made without departing from the spirit and scope of the invention. It is, therefore, intended that the appended claims be interpreted as including all such changes and modifications.

What is claimed is:

1. A magnetic head assembly comprising a deflectable piezo-electric member adapted for deflection in response to a voltage applied thereto; a magnetic head mounted on one end of said piezo-electric member; a U-shaped protective holder for supporting said piezo-electric member, said U-shaped holder being formed of resilient material and having a base from which a pair of legs extend with free ends of said legs being spring biased toward each other and with sand base having a window therein; said piezo-electric member extending between said legs with said one end protruding through said window and with the end of said piezo-electric member remote from said one end thereof being positioned between and clamped by said spring biased free ends of said legs of said U-shaped holder; and means for applying a voltage to said piezo-electric member at said remote end thereof, said means being clamped between said spring biased free ends of said legs.

2. The assembly of claim 1 wherein said means for applying a voltage of said piezo-electric member comprises at least one conducting lead; at least one plate member receiving said at least one conducting lead; said at least one plate member being disposed between at least one of said free ends of the legs of said U-shaped holder and said remote end of said piezo-electric member so as to be clamped to said remote end of said piezo-electric member by said spring biased free ends of said holder; and solderless means for providing an electrical connection between said at least one conducting lead and said piezo-electric member.

3. The assembly of claim 2 wherein the free end of at least one of said legs of said holder is contoured to receive at least one plate member.

4. The assembly of claim 2 wherein the free end of said at least one leg of said holder is provided with a cut-out to receive said at least one plate member.

5. The assembly of claim 2 wherein said at least one plate member has a recess therein for receiving said at least one conducting lead and also for receiving said means for providing an electrical connection.

6. The assembly of claim 5 wherein said at least one plate member is formed of insulating material; and wherein said means for providing an electrical connection comprises a strip of conductive rubber material.

7. The assembly of claim 6 wherein said piezo-electric member is provided with a surface of electrically conductive material, said surface being in electrical contact with said strip of conductive rubber material.

8. The assembly of claim 1 further comprising means for adjusting the spring biasing of the legs of said U-shaped holder.

9. The assembly of claim 8 wherein said means for adjusting the spring biasing comprises at least one screw member; and at least one hole provided in one of said legs of said holder threaded to receive said screw member; whereby said screw member abuts against the other of said legs and, when rotated, changes the separation of said legs.

10. A magnetic head assembly comprising an electrically responsive bi-morph leaf assembly having top and bottom surfaces of electrically conductive material; a magnetic head mounted on one end of said bi-morph leaf assembly; a U-shaped protective holder for said bi-morph leaf assembly, said U-shaped holder being formed of resilient material and having a base from which a pair of legs extend with free ends of said legs being spring biased toward each other and with said base having a window therein; a pair of plates, each formed of insulating material; at least the end portion of said bi-morph leaf assembly remote from said one end being sandwiched between said pair of plates; said bi-morph leaf assembly extending between said legs with said one end protruding through said window and with the said plates and said remote end portion of said bi-morph leaf assembly being positioned between and clamped by said spring biased free ends of said legs of said holder; a conducting member provided on at least one of said plates and clamped in solderless electrical contact with the adjacent one of said top and bottom surfaces of said bi-morph leaf assembly by said spring biased legs; and means for applying a voltage to said conducting member.

11. The assembly of claim 10 wherein a conducting member is provided on each of said plates, each conducting member being in electrical contact with a respective top and bottom surface of said bi-morph leaf assembly.

12. The assembly of claim 10 wherein said conducting member is a strip of conductive rubber material received in a recess in a respective plate.

13. The assembly of claim 12 wherein said means for applying a voltage comprises a conducting lead connected to said strip of conductive rubber material; and wherein a respective plate includes a channel for receiving said conducting lead to provide a passageway therefor.

14. The assembly of claim 10 wherein each of said legs comprises a rectangular plate member.

15. The assembly of claim 14 wherein at least one of said rectangular plate members is provided with a mounting hole by which said assembly can be mounted to another device.

* * * * *